(No Model.)

J. F. EASTMAN.
WAGON JACK.

No. 324,543. Patented Aug. 18, 1885.

WITNESSES:
Theo. G. Hoster
C. Sedgwick

INVENTOR:
J. F. Eastman
BY Munn & Co.
ATTORNEYS.

UNITED STATES PATENT OFFICE.

JOHN F. EASTMAN, OF TRIUMPH, ILLINOIS.

WAGON-JACK.

SPECIFICATION forming part of Letters Patent No. 324,543, dated August 18, 1885.

Application filed February 11, 1885. (No model.)

*To all whom it may concern:*

Be it known that I, JOHN F. EASTMAN, of Triumph, in the county of La Salle and State of Illinois, have invented a new and Improved Wagon-Jack, of which the following is a full, clear, and exact description.

The object of my invention is to provide a new and improved wagon-jack which is simple in construction, strong and durable, and can easily be adjusted for wagons of different heights.

The invention consists in the combination, with a hollow standard, of a toothed bar in the same, a clutch-plate through which the toothed bar passes, and of a lever pivoted on the standard and having a curved cam part on its upper end, which cam part is adapted to act on the clutch-plate.

Reference is to be had to the accompanying drawings, forming part of this specification, in which similar letters of reference indicate corresponding parts in both the figures.

Figure 1:
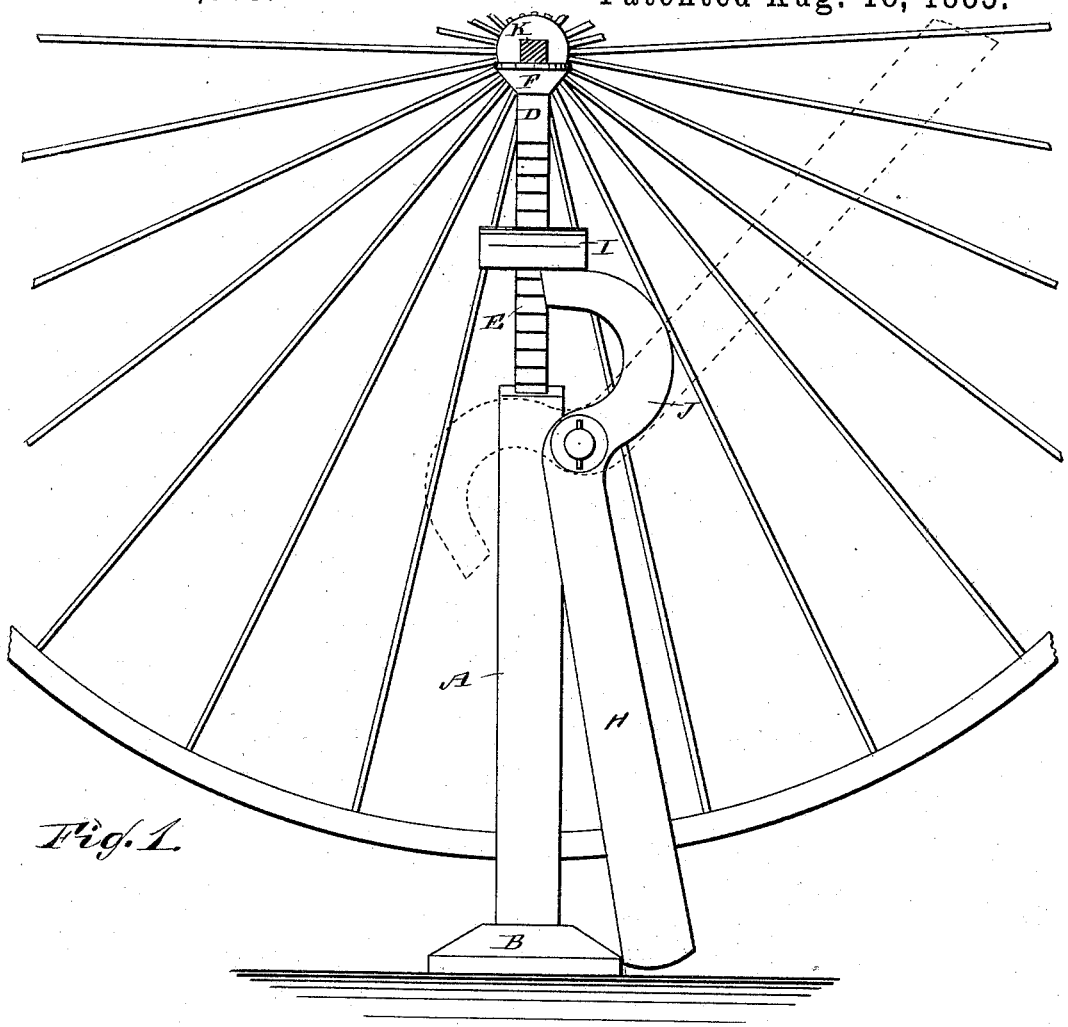
Figure 2:
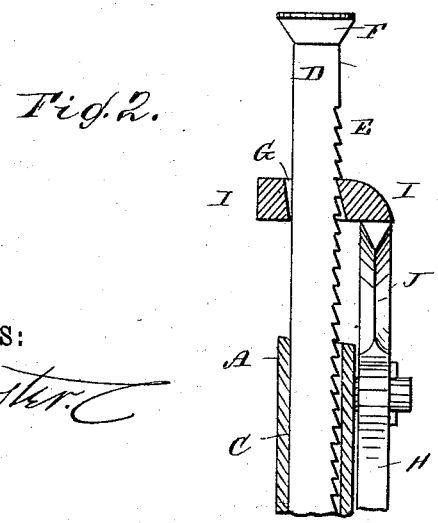

Figure 1 is a side view of my improved wagon-jack, showing the manner in which it is used. Fig. 2 is a cross-sectional elevation of the upper part of the same.

The standard A, having a base, B, is provided with an aperture, C, extending from the top downward and adapted to receive a vertically-sliding bar, D, having downwardly-inclined teeth E, and also having a head, F, on its upper end. The toothed bar D is also passed through a clutch-plate, I, the sides of the aperture G of which have the same inclination as the teeth E and one edge of the clutch-plate projecting beyond the side of the standard A.

A lever, H, is pivoted on a jaw or lug on the standard A at the top, and above its pivot is provided with a semicircularly-curved cam part, J. The long arm of the lever H is raised, as shown in dotted lines in Fig. 1, and the toothed bar D is pulled up until its head F rests against the bottom edge of the axle K, the clutch-plate I remaining on the upper end of the standard A. The long end of the lever H is then swung down and its cam part acts on the clutch-plate I and raises the same. As the toothed bar D is engaged by means of one of its teeth with the clutch-plate I, the said bar and the axle on it will also be raised. When the lever H is swung down into the position shown in full lines in Fig. 1, the point on which the axle rests, the pivot, and the lower end of the lever will be in line, and the lever is thus locked in place automatically and the axle is held raised.

As the bar D is raised until the head F rests against the axle K before using the lever H, the jack can easily be used on wagons having their axles at different elevations above the ground, the clutch-plate I engaging with teeth a greater or less distance from the upper end of the bar D, according to the height of the axle above the ground, so that the clutch I may automatically engage with the teeth of the bar D. The top of the standard A is slightly beveled, whereby the clutch-plate I will be at an inclination to the bar D, and the undercut side of its opening will at all times engage with the teeth E on the bar D.

Having thus described my invention, what I claim as new, and desire to secure by Letters Patent, is—

1. A wagon-jack consisting, essentially, in a standard, a vertical sliding toothed bar thereon, a clutch-plate on the toothed bar, and a lever pivoted on the standard and constructed to bear against the under side of the clutch-plate and force it into engagement with the teeth on the toothed bar, substantially as set forth.

2. In a wagon-jack, the combination, with the hollow standard A, having its top beveled, of the toothed bar D in the standard, the clutch-plate I, having a beveled aperture, G, and of the lever H, pivoted on the standard and having a curved cam part, J, on its upper end, substantially as herein shown and described.

JOHN F. EASTMAN.

Witnesses:
DON B. FARNHAM,
D. P. GOSS.